(12) United States Patent
Jiang et al.

(10) Patent No.: US 11,757,566 B2
(45) Date of Patent: Sep. 12, 2023

(54) METHOD AND DEVICE IN UE AND BASE STATION FOR MULTI-ANTENNA COMMUNICATION

(71) Applicants: Qi Jiang, Shanghai (CN); Xiaobo Zhang, Shanghai (CN)

(72) Inventors: Qi Jiang, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 17/728,930

(22) Filed: Apr. 25, 2022

(65) Prior Publication Data

US 2022/0255658 A1 Aug. 11, 2022

Related U.S. Application Data

(63) Continuation of application No. 16/733,218, filed on Jan. 2, 2020, now Pat. No. 11,349,597, which is a
(Continued)

(51) Int. Cl.
*H04L 1/00* (2006.01)
*H04B 7/06* (2006.01)
(Continued)

(52) U.S. Cl.
CPC ......... *H04L 1/0038* (2013.01); *H04B 7/0617* (2013.01); *H04W 24/08* (2013.01); *H04W 72/0446* (2013.01); *H04W 72/0453* (2013.01)

(58) Field of Classification Search
CPC ... H04L 5/0053; H04L 5/0094; H04L 5/0055; H04L 5/0007; H04L 5/0044;
(Continued)

(56) References Cited

U.S. PATENT DOCUMENTS 9,497,742 B2 * 11/2016 Gao ................. H04L 5/0057
2012/0113941 A1 * 5/2012 Chung ............. H04L 27/2602
370/329
(Continued)

FOREIGN PATENT DOCUMENTS

CN 101151818 A 3/2008
CN 103188029 A 7/2013
(Continued)

OTHER PUBLICATIONS

ISR received in application No. PCT/CN2017/091408 dated Mar. 23, 2018.
(Continued)

*Primary Examiner* — Dady Chery

(57) ABSTRACT

The disclosure provides a method and a device in a User Equipment (UE) and a base station for multi-antenna communication. The UE first monitors a first signaling set in a first time-frequency resource set, then transmits a first radio signal, and finally monitors a second signaling set and a third signaling set in a second time-frequency resource set and a third time-frequency resource set respectively; the first radio signal is used for triggering a monitoring of the second signaling set; and the first radio signal is used for determining that a number of maximum blind decoding times for the third signaling set in the third time-frequency resource set changes from X1 to X3. A new blind decoding mechanism is designed through transmitting the first radio signal, thus the number of blind decoding times of the UE is reassigned, the reception complexity and power consumption of the UE are reduced.

20 Claims, 8 Drawing Sheets

Related U.S. Application Data continuation of application No. PCT/CN2017/091408, filed on Jul. 3, 2017.

(51) Int. Cl.
*H04W 24/08* (2009.01)
*H04W 72/0446* (2023.01)
*H04W 72/0453* (2023.01)

(58) Field of Classification Search
CPC .......... H04L 1/0038; H04W 56/005; H04W 88/023; H04W 88/08; H04W 92/10; H04W 72/04; H04W 72/12; H04W 72/042; H04W 72/1268; H04W 24/08; H04W 72/0446; H04W 72/0453; H04W 48/16; H04W 72/044; H04W 72/085; H04B 7/0617; H04B 7/0695
See application file for complete search history.

(56) References Cited

U.S. PATENT DOCUMENTS

| | | | | |
|---|---|---|---|---|
| 2015/0103796 | A1* | 4/2015 | Chung | H04L 1/1861 370/329 |
| 2015/0181574 | A1* | 6/2015 | Lee | H04J 11/0069 370/329 |
| 2015/0208408 | A1* | 7/2015 | Berggren | H04L 1/1861 370/329 |
| 2015/0222402 | A1* | 8/2015 | Ouchi | H04W 72/0413 370/329 |
| 2015/0296542 | A1 | 10/2015 | Heo | |
| 2017/0126358 | A1 | 5/2017 | Rong | |
| 2018/0337763 | A1* | 11/2018 | Shi | H04L 1/1864 |
| 2019/0140769 | A1* | 5/2019 | Rong | H04L 1/0052 |
| 2019/0207734 | A1* | 7/2019 | Yang | H04L 1/0061 |

FOREIGN PATENT DOCUMENTS

| | | |
|---|---|---|
| CN | 106612165 A | 5/2017 |
| WO | 2013141654 A1 | 9/2013 |
| WO | 2014027810 A1 | 2/2014 |
| WO | 2014042456 A1 | 3/2014 |

OTHER PUBLICATIONS

First Office Action of Chinses patent application No. CN201780092209.7 dated Jun. 8, 2022.
First Search Report of Chinses patent application No. CN201780092209.7 dated Jun. 1, 2022.
Notification to Grant Patent Right for Invention of Chinses patent application No. CN201780092209.7 dated Oct. 28, 2022.
Alcatel-Lucent Support of carrier aggregation for FDD and related control signalling with blind decoding reduction 3GPP TSG RAN WG1 #58 Meeting R1-093014 Aug. 19, 2009.
Huawei, HiSilicon DCI monitoring occasions and blind detections 3GPP TSG-RAN WG1 Meeting #88 R1-1701643 Feb. 28, 2017.
NTT Docomo, Inc Views on search space design for NR-PDCCH 3GPP TSG RAN WG1 NR Ad-Hoc#2 R1-1711091 Jun. 30, 2017.

\* cited by examiner

METHOD AND DEVICE IN UE AND BASE STATION FOR MULTI-ANTENNA COMMUNICATION

CROSS-REFERENCE TO RELATED APPLICATION

This application is a continuation of the U.S. patent application Ser. No. 16/733,218, filed on Jan. 2, 2020, which is a continuation of International Application No. PCT/CN2017/091408, filed Jul. 3, 2017, the full disclosure of which is incorporated herein by reference.

BACKGROUND

Technical Field

The disclosure relates to methods and devices for multi-antenna communication, and in particular to a method and a device for receiving physical layer control signalings.

Related Art

In existing Long Term Evolution (LTE) systems, for a downlink subframe, a User Equipment (UE) will search for corresponding Downlink Control Information (DCI) in the downlink subframe. A downlink grant generally schedules a Downlink Shared Channel (DL-SCH) of a current subframe, while an uplink grant generally schedules an Uplink Shared Channel (UL-SCH) of a subsequent subframe. The system assigns two different DCI formats to the UE through a higher-layer signaling, the two different DCI formats correspond to two different payload sizes respectively, and the UE performs blind decoding based on different payload sizes when receiving DCIs; however, the number of maximum blind decoding times of the UE on a given carrier is limited. In 5G communication systems, beamforming will be widely applied, and the DCL blind decoding method in beamforming based application scenarios needs to be reconsidered.

SUMMARY

In 5G systems, concepts of Beam Recovery (BR) and Beam Link Failure (BLF) are being discussed, a UE detects multiple current beams to acquire dynamic scheduling, and when channel qualities of multiple beams detected by the UE degrade, the UE transmits a Beam Recovery Request (BRR) to a base station to request for new beam resources so as to monitor physical layer control signalings.

The introduction of the above concepts is to ensure that the UE can quickly switch to another beam to be served when finding that the channel quality corresponding to one beam degrades. The above processes of BR and BLF do not trigger a process of Radio Resource Control (RRC) layer, and this method guarantees the quick switch between beams. At present, 3GPP has defined that, when a UE transmits a BRR, the BRR carries beam information recommended by the UE, and the UE will monitor a feedback of the BRR on the recommended beam. In view of the above problems, considering the reception of other DCIs for non-BRR feedback, one simple implementation is that the UE adds a positive integer number of blind decoding times to the feedback of the BBR without impacting the reception of normal DCIs; however, this method obviously increases the complexity of blind decoding of the UE.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station if no conflict is incurred, and vice versa.

The disclosure provides a method in a UE for multi-antenna communication, wherein the method includes:
monitoring a first signaling set in a first time-frequency resource set;
transmitting a first radio signal; and
monitoring a second signaling set and a third signaling set in a second time-frequency resource set and a third time-frequency resource set respectively.

Herein, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a monitoring of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

In one embodiment, the above method has the following benefits: the blind decoding of the second signaling will not increase the total number of blind decoding times of the UE, thereby reducing the complexity of implementation of the UE.

In one embodiment, the above method has another following benefit: when the UE is in a BR state, that is, when the UE completes transmitting a BRR, the number of blind decoding times of the UE for the third signaling set changes to X3, which effectively reduces the number of blind decoding times of the UE and the power consumption of the UE.

In one embodiment, the design principle of the above method is that: when the UE is in a BR state, the beams used by the UE to monitor physical layer dynamic signalings obviously are of poor quality. In this scenario, the UE has relatively less scheduling opportunities and needs a transmission of more robust physical layer control signalings; thus, the UE does not need to reserve the number of control signaling candidates corresponding to normal channel conditions.

According to one aspect of the disclosure, the above method is characterized in that: a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; and the X2 is a positive integer less than the X1.

In one embodiment, the above method has the following benefits: time-frequency resources occupied by control signaling candidates for the third signaling set all come from time-frequency resources occupied by control signaling candidates for the first signaling set, which avoids that extra time-frequency resources are assigned to monitor the third signaling set due to reception of the second signaling set.

In one embodiment, the above method has another following benefit: the X2 is less than the X1, that is, the number of blind decoding times for the second signaling is limited, so as to reduce the complexity of implementation of the UE.

According to one aspect of the disclosure, the above method is characterized in that: a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

In one embodiment, the above method has the following benefits: the first time-frequency resource set corresponds to a first search space, the third time-frequency resource set corresponds to a third search space, the first search space and the third search space occupy same REs in respective corresponding time-frequency resource blocks, which avoids a reconfiguration of a new Radio Resource Control (RRC) signaling in the BR process.

In one embodiment, the above method has the following benefits: the first time-frequency resource block corresponds to a first CORESET, the second time-frequency resource block corresponds to a second CORESET, the first CORESET and the second CORESET occupy same frequency-domain resources, to avoid assigning new resources to the blind decoding of physical layer dynamic signalings, and to reduce overheads of control signalings.

According to one aspect of the disclosure, the above method is characterized in that: the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs.

In one embodiment, the above method has the following benefits: both the first-type RE set and the second-type RE set correspond to one same format of DCI, and keeping the patterns same is beneficial to simplifying the blind decoding of control signalings.

According to one aspect of the disclosure, the above method is characterized in that: a number of REs included in any one of the X1 first-type RE sets other than the X3 first-type RE set(s) is less than or equal to a number of REs included in any one of the X3 second-type RE set(s).

In one embodiment, the above method has the following benefits: when the UE is in a BR state, the second-type RE set in the BR state occupy more REs, thereby guaranteeing the robustness of the third signaling set.

According to one aspect of the disclosure, the above method is characterized in that: the first radio signal is used for determining a first antenna port group, the first antenna port group includes a positive integer number of antenna ports, the UE assumes that the second signaling set is transmitted by the first antenna port group.

According to one aspect of the disclosure, the above method includes:

monitoring K target radio signal(s) in K target antenna port group(s) respectively.

Herein, the K target radio signal(s) is(are) used for determining K channel quality (qualities), at least one of the K target antenna port group(s) is used for transmitting the first signaling set, the first antenna port group is one antenna port group other than the K target antenna port group(s), and the K is a positive integer.

In one embodiment, the above method is characterized in that: the K target antenna port group(s) corresponds (correspond) to K transmitting antenna port group(s) when the UE monitor physical layer dynamic signalings; when the K channel quality (qualities) corresponds (correspond) to the K target antenna port group(s) degrade(s), the UE initiates a BR process.

According to one aspect of the disclosure, the above method includes:

receiving a second radio signal.

Herein, the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set.

The disclosure provides a method in a base station for multi-antenna communication, wherein the method includes:

transmitting a first signaling set in a first time-frequency resource set;

receiving a first radio signal; and transmitting a second signaling set and a third signaling set in a second time-frequency resource set and a third time-frequency resource set respectively.

Herein, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a transmission of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

According to one aspect of the disclosure, the above method is characterized in that: a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; and the X2 is a positive integer less than the X1.

According to one aspect of the disclosure, the above method is characterized in that: a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

According to one aspect of the disclosure, the above method is characterized in that: the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs.

According to one aspect of the disclosure, the above method is characterized in that: a number of REs included in any one of the X1 first-type RE sets other than the X3 first-type RE set(s) is less than or equal to a number of REs included in any one of the X3 second-type RE set(s).

According to one aspect of the disclosure, the above method is characterized in that: the first radio signal is used for determining a first antenna port group, the first antenna port group includes a positive integer number of antenna ports, the second signaling set is transmitted by the first antenna port group.

According to one aspect of the disclosure, the above method includes:

transmitting K target radio signal(s) in K target antenna port group(s) respectively.

Herein, the K target radio signal(s) is(are) used by a transmitter of the first radio signal to determine K channel quality (qualities) respectively, at least one of the K target antenna port group(s) is used for transmitting the first signaling set, the first antenna port group is one antenna port group other than the K target antenna port group(s), and the K is a positive integer.

The disclosure provides a UE for multi-antenna communication, wherein the UE includes:

a first receiver, to monitor a first signaling set in a first time-frequency resource set;

a first transmitter, to transmit a first radio signal; and a second receiver, to monitor a second signaling set and a third signaling set in a second time-frequency resource set and a third time-frequency resource set respectively.

Herein, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a monitoring of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

In one embodiment, the above UE for multiantenna communication is characterized in that: a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; and the X2 is a positive integer less than the X1.

In one embodiment, the above UE for multiantenna communication is characterized in that: a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

In one embodiment, the above UE for multiantenna communication is characterized in that: the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs.

In one embodiment, the above UE for multiantenna communication is characterized in that: a number of REs included in any one of the X1 first-type RE sets other than the X3 first-type RE set(s) is less than or equal to a number of REs included in any one of the X3 second-type RE set(s).

In one embodiment, the above UE for multiantenna communication is characterized in that: the first radio signal is used for determining a first antenna port group, the first antenna port group includes a positive integer number of antenna ports, and the UE assumes that the second signaling set is transmitted by the first antenna port group.

In one embodiment, the above UE for multiantenna communication is characterized in that: the first receiver further monitors K target radio signal(s) in K target antenna port group(s) respectively; the K target radio signal(s) is(are) used for determining K channel quality (qualities), at least one of the K target antenna port group(s) is used for transmitting the first signaling set, the first antenna port group is one antenna port group other than the K target antenna port group(s), and the K is a positive integer.

In one embodiment, the above UE for multiantenna communication is characterized in that: the first receiver further receives a second radio signal, the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set.

The disclosure provides a base station for multi-antenna communication, wherein the base station includes:

a second transmitter, to transmit a first signaling set in a first time-frequency resource set;

a third receiver, to receive a first radio signal;

a third transmitter, to transmit a second signaling set and a third signaling set in a second time-frequency resource set and a third time-frequency resource set respectively.

Herein, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a transmission of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

In one embodiment, the above base station for multiantenna communication is characterized in that: a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; and the X2 is a positive integer less than the X1.

In one embodiment, the above base station for multiantenna communication is characterized in that: a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

In one embodiment, the above base station for multiantenna communication is characterized in that: the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs.

In one embodiment, the above base station for multiantenna communication is characterized in that: a number of REs included in any one of the X1 first-type RE sets other than the X3 first-type RE set(s) is less than or equal to a number of REs included in any one of the X3 second-type RE set(s).

In one embodiment, the above base station for multiantenna communication is characterized in that: the first radio signal is used for determining a first antenna port group, the first antenna port group includes a positive integer number of antenna ports, and the second signaling set is transmitted by the first antenna port group.

In one embodiment, the above base station for multiantenna communication is characterized in that: the second transmitter further transmits K target radio signal(s) in K target antenna port group(s) respectively; the K target radio signal(s) is(are) used by a transmitter of the first radio signal to determine K channel quality (qualities) respectively, at least one of the K target antenna port group(s) is used for transmitting the first signaling set, the first antenna port group is one antenna port group other than the K target antenna port group(s), and the K is a positive integer.

In one embodiment, the above base station for multiantenna communication is characterized in that: the second transmitter further transmits a second radio signal; the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set.

In one embodiment, compared with the prior art, the disclosure has the following technical advantages.

Through designing a new blind decoding method for the UE, when the UE is in a BR state, the blind decoding of the second signaling will not increase the total number of blind decoding times of the UE, thereby reducing the complexity of implementation of the UE.

Through designing a new blind decoding method, when the UE is in a BR state, the number of blind decoding times of the UE for the third signaling set changes to X3, which effectively reduces the number of blind decoding times of the UE and the power consumption of the UE.

Time-frequency resources occupied by candidates for the third signaling set all come from time-frequency resources occupied by candidates for the first signaling set, which avoids that extra time-frequency resources are assigned to monitor the third signaling set due to reception of the second signaling set.

Both the first-type RE set and the second-type RE set correspond to one same format of DCI, and keeping the first-type RE set and the second-type RE set in one same pattern is beneficial to simplifying the blind decoding of control signalings; the second-type RE set in the BR state occupy more REs, thereby guaranteeing the robustness of the third signaling set.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be mutually combined arbitrarily if no conflict is incurred.

Embodiment 1

Figure 1:
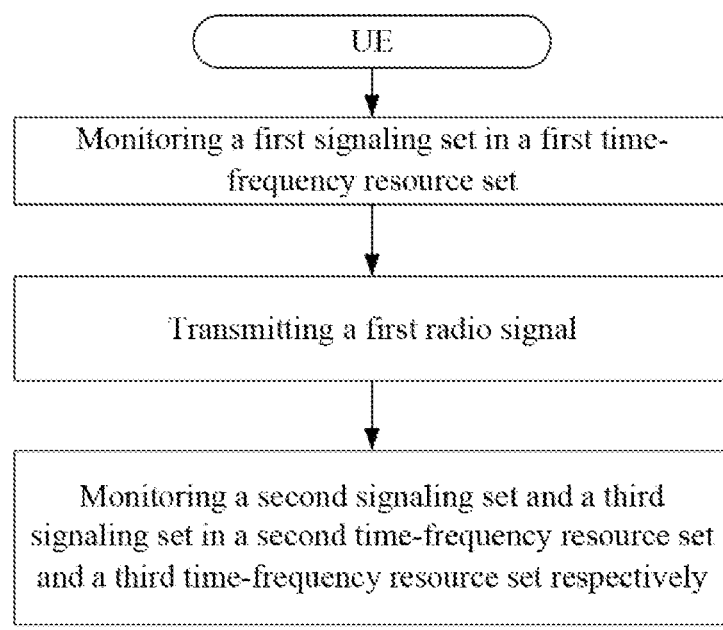
FIG. 1 is a flowchart of a first radio signal according to one embodiment of the disclosure.

Embodiment 1 illustrates an example of a flowchart of a first radio signal according to the disclosure, as shown in FIG. 1. The UE in the disclosure first monitors a first signaling set in a first time-frequency resource set, then transmits a first radio signal, and finally monitors a second signaling set and a third signaling set in a second time-frequency resource set and a third time-frequency resource set respectively. The first signaling set, the second signaling set and third signaling set include M1 format(s) of physical layer signaling(s), M2 format(s) of physical layer signaling (s) and M3 format(s) of physical layer signaling(s) respectively, the M1, the M2 and the M3 being positive integers respectively; the first radio signal is used for triggering a monitoring of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

In one subembodiment, the phrase that the first radio signal is used for triggering a monitoring of the second signaling set refers that: the UE performs blind decoding of the second signaling set within a given time window after transmitting the first radio signal.

In one subembodiment, the phrase that the first radio signal is used for triggering a monitoring of the second signaling set refers that: the UE performs blind decoding of the second signaling set within a given time window, and a position of the given time window is related to time-domain resources occupied by the first radio signal.

In one affiliated embodiment of the above subembodiment, the given time window is located behind the first radio signal in time domain.

In one affiliated embodiment of the above subembodiment, the given time window occupies a positive integer number of consecutive subframes.

In one affiliated embodiment of the above subembodiment, the given time window occupies a positive integer number of consecutive slots.

In one affiliated embodiment of the above subembodiment, the given time window occupies a positive integer number of consecutive mini-slots.

In one subembodiment, the phrase that the first radio signal is used for determining that a number of maximum blind decoding times for the third signaling set in the third time-frequency resource set changes from X1 to X3 refers that: when the UE does not transmit the first radio signal, a number of maximum blind decoding times for the third signaling set in the third time-frequency resource set is the X1.

In one subembodiment, the phrase that the first radio signal is used for determining that a number of maximum blind decoding times for the third signaling set in the third time-frequency resource set changes from X1 to X3 refers that: if a serving cell of the UE correctly receives the first radio signal, the serving cell of the UE assumes that a number of maximum blind decoding times of the UE for the third signaling set in the third time-frequency resource is the X3; otherwise, the serving cell of the UE assumes that a number of maximum blind decoding times of the UE for the third signaling set in the third time-frequency resource set is the X1.

In one subembodiment, the monitoring refers that: the UE performs blind decoding of a given signaling set according to a given format, the given format belongs to the M1 format(s) and the given signaling set is the first signaling set, or the given format belongs to the M2 format(s) and the given signaling set is the second signaling set, or the given format belongs to the M3 format(s) and the given signaling set is the third signaling set.

In one subembodiment, the blind decoding is a demodulation decoding of a DCI.

In one subembodiment, the blind decoding includes a Cyclic Redundancy Check (CRC).

In one subembodiment, the monitoring refers that: the UE determines whether a target signaling set is transmitted according to a CRC check, and the target signaling set is one of the first signaling set, the second signaling set or the third signaling set.

In one subembodiment, the blind decoding includes: performing channel decoding of a received signal in a target RE set, and performing a CRC check on decoded bits to determine whether the received signal includes a target physical layer signaling.

In one affiliated embodiment of the above subembodiment, the blind decoding is based on polar coding.

In one affiliated embodiment of the above subembodiment, the target physical layer signaling belongs to one of the first signaling set, the second signaling set or the third signaling set.

In one subembodiment, the blind decoding is also known as blind detection.

In one subembodiment, a format of the physical layer signaling corresponds to a DCI format.

In one subembodiment, the first signaling set includes a positive integer number of first signalings, and a physical layer channel corresponding to the first signaling is one of a Physical Downlink Control Channel (PDCCH), a New RAT PDCCH (NR-PDCCH) or a Short Latency PDCCH (SPDCCH).

In one subembodiment, the second signaling set includes a positive integer number of second signalings, and a physical layer channel corresponding to the second signaling is one of a PDCCH, an NR-PDCCH or an SPDCCH.

In one subembodiment, the third signaling set includes a positive integer number of third signalings, and a physical layer channel corresponding to the third signaling is one of a PDCCH, an NR-PDCCH or an SPDCCH.

In one subembodiment, the first radio signal is used for transmitting a BRR.

In one subembodiment, the first radio signal is transmitted in a Random Access Channel (RACH).

In one subembodiment, the first radio signal is transmitted in an UL-SCH.

In one subembodiment, the first radio signal is transmitted in Uplink Control Information (UCI).

In one subembodiment, the first radio signal is used for triggering a monitoring of the second signaling set in a first time window.

In one affiliated embodiment of the above subembodiment, the first time window includes T time sub-windows in time domain, the T being a positive integer.

In one example of the above affiliated embodiment, the T is equal to 1.

In one example of the above affiliated embodiment, the T time sub-windows are consecutive in time domain.

In one example of the above affiliated embodiment, the time sub-window is one of a subframe, a slot or a mini-slot.

In one subembodiment, a target time-frequency resource set is composed of a positive integer number of Resource Elements (REs), the target time-frequency resource set includes at least two REs corresponding to different subcarrier spacings, and the target time-frequency resource set is one of the first time-frequency resource set, the second time-frequency resource set or the third time-frequency resource set.

In one subembodiment, the first time-frequency resource set, the second time-frequency resource set and the third time-frequency resource set are composed of multiple REs respectively.

In one subembodiment, the M1 is greater than 1.

In one subembodiment, the M2 is equal to 1.

In one subembodiment, the M3 is greater than 1.

In one subembodiment, the M1 is equal to the M3, and the M1 format(s) is(are) the same as the M3 format(s).

In one subembodiment, any of the M2 format(s) does not belong to the M1 format(s).

In one subembodiment, the M2 format(s) include(s) at least one format that does not belong to the M1 format(s).

In one subembodiment, any of the M2 format(s) does not belong to the M3 format(s).

In one subembodiment, the M2 format(s) include(s) at least one format that does not belong to the M3 format(s).

In one subembodiment, the second signaling set includes a target signaling only.

In one affiliated embodiment of the above subembodiment, the target signaling includes a CRC, and the CRC is scrambled with a Radio Network Temporary Identity (RNTI) other than a UE-specific RNTI.

In one affiliated embodiment of the above subembodiment, the target signaling is used for scheduling a beam recovery request response.

In one affiliated embodiment of the above subembodiment, the target signaling includes a scheduled beam recovery request response.

Embodiment 2

Figure 2:
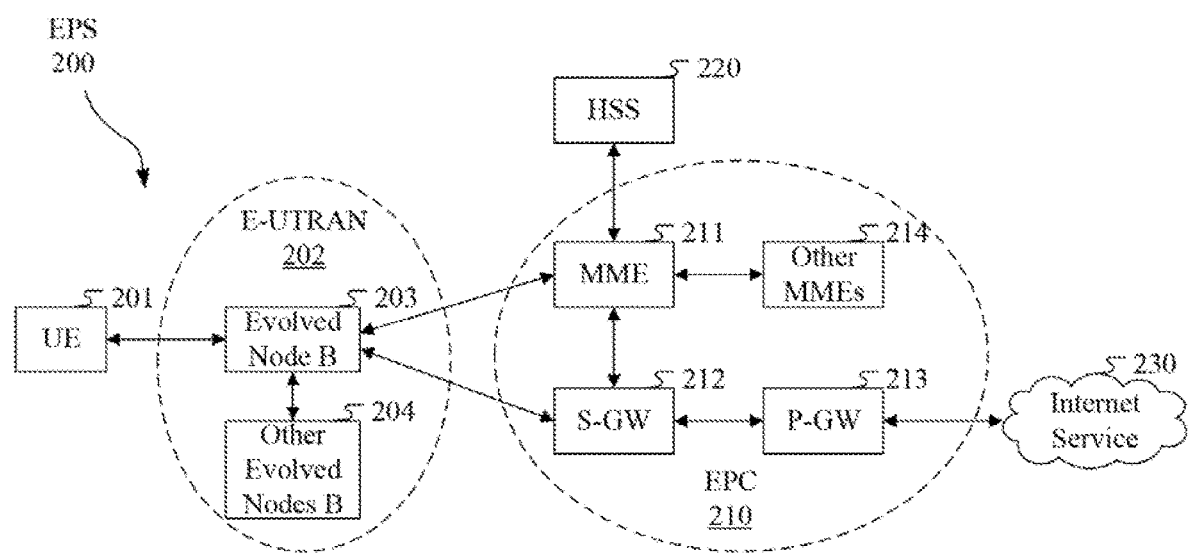
FIG. 2 is a diagram illustrating a network architecture according to one embodiment of the disclosure.

Embodiment 2 illustrates an example of a diagram of a network architecture according to the disclosure, as shown in FIG. 2. FIG. 2 is a diagram illustrating a network architecture 200 of Long-Term Evolution (LTE), Long-Term Evolution Advanced (LTE-A) future 5G systems. The LTE network architecture 200 may be called an Evolved Packet System (EPS) 200. The EPS 200 may include one or more UEs 201, an Evolved-UMTS Territorial Radio Access Network (E-UTRAN) 202, an Evolved Packet Core (EPC) 210, a Home Subscriber Server (HSS) 220 and an Internet service 230. Herein, UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The E-UTRAN includes an Evolved node B (eNB) 203 and other eNBs 204. The eNB 203 provides UE 201 oriented user plane and control plane protocol terminations. The eNB 203 may be connected to other eNBs 204 via an Xn interface (for example, backhaul). The eNB 203 may be called a base station, a base transceiver station, a radio base station, a radio transceiver, a transceiver function, a Basic Service Set (BSS), an Extended Service Set (ESS), a TRP or some other appropriate terms. The eNB 203 provides an access point of the EPC 210 for the UE 201. Examples of UE 201 include cellular phones, smart phones, Session Initiation Protocol (SIP) phones, laptop computers, Personal Digital Assistants (PDAs), satellite radios, Global Positioning Systems (GPSs), multimedia devices, video devices, digital audio player (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, or some other appropriate terms. The eNB 203 is connected to the EPC 210 via an S1 interface. The EPC 210 includes a Mobility Management Entity (MME) 211, other MMEs 214, a Service Gateway (S-GW) 212 and a Packet Data Network Gateway (P-GW) 213. The MME 211 is a control node for processing a signaling between the UE 201 and the EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the eNB 203 corresponds to the base station in the disclosure.

In one subembodiment, the UE 201 supports multi-antenna communication.

In one subembodiment, the UE 201 supports beamforming based communication.

In one subembodiment, the eNB 203 supports beamforming based communication.

Embodiment 3

Figure 3:
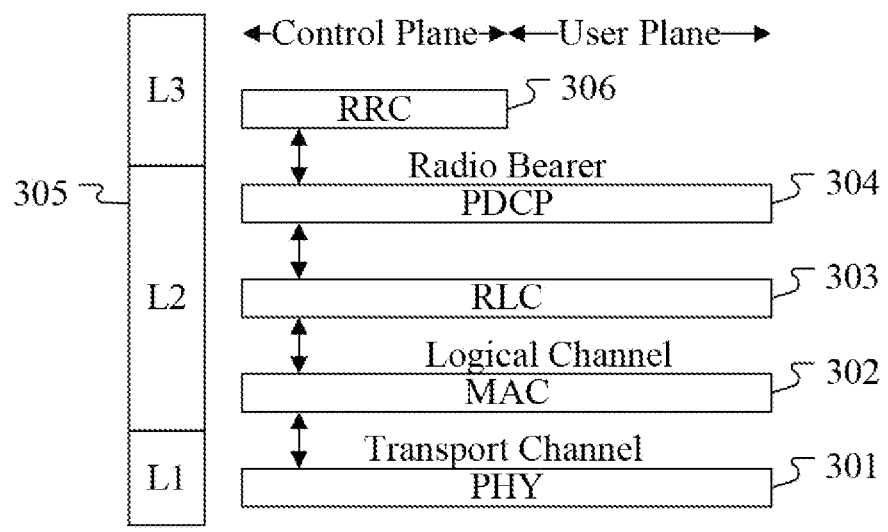
FIG. 3 is a diagram illustrating a radio protocol architecture of a user plane and a control plane according to one embodiment of the disclosure.

Embodiment 3 illustrates a diagram of an embodiment of a radio protocol architecture of a user plane and a control plane according to the disclosure, as shown in FIG. 3. FIG. 3 is a diagram illustrating an embodiment of a radio protocol architecture of a user plane and a control plane. In FIG. 3, the radio protocol architecture of a UE and an eNB is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the eNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the eNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between eNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the eNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the eNB and the UE.

In one subembodiment, the radio protocol architecture shown in FIG. 3 is applicable to the UE in the disclosure.

In one subembodiment, the first signaling set in the disclosure is generated on the PHY 301.

In one subembodiment, the second signaling set in the disclosure is generated on the PHY 301.

In one subembodiment, the third signaling set in the disclosure is generated on the PHY 301.

In one subembodiment, the first radio signal in the disclosure is generated on the MAC sublayer 302.

In one subembodiment, the first radio signal in the disclosure is terminated on the MAC sublayer 302.

In one subembodiment, the second radio signal in the disclosure is generated on the RRC sublayer 306.

Embodiment 4

Figure 4:
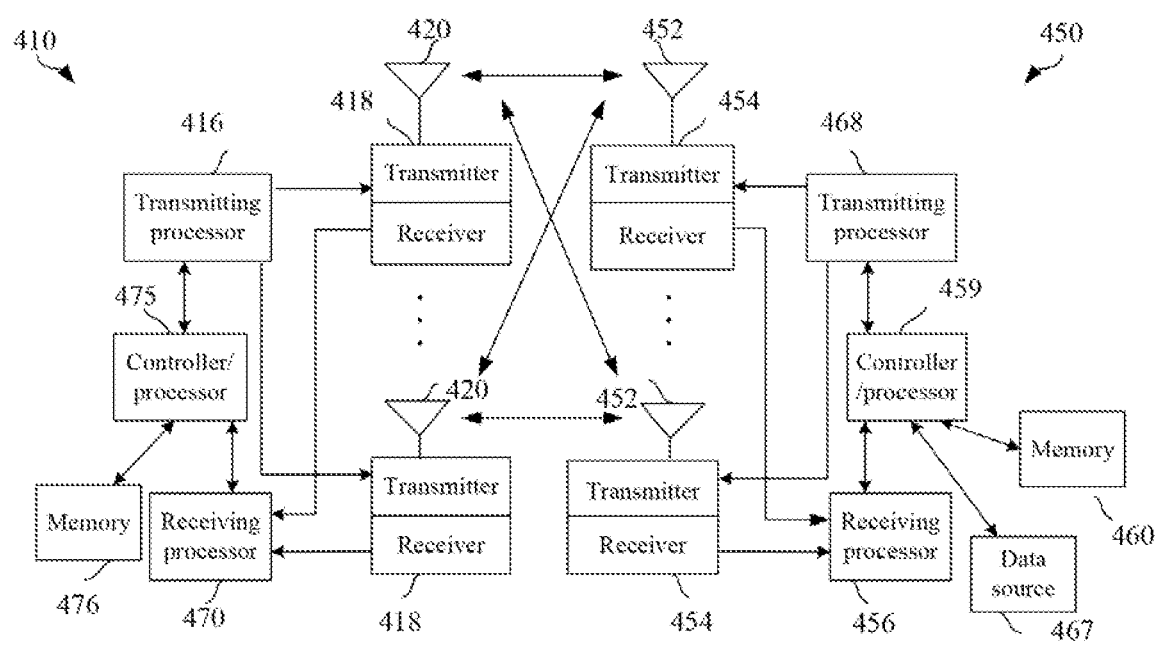
FIG. 4 is a diagram illustrating an eNB and a given UE according to one embodiment of the disclosure.

Embodiment 4 illustrates a diagram of an eNB and a given UE according to the disclosure, as shown in FIG. 4. FIG. 4 is a block diagram of an eNB 410 in communication with a UE 450 in an access network. In Downlink (DL), a higher-layer packet from a core network is provided to the controller/processor 475. The controller/processor 475 provides functions of Layer 2. In DL, the controller/processor 475 provides header compression, encryption, packet segmentation and reordering, multiplexing between a logical channel and a transport channel, and a radio resource allocation for the node 450 based on various priority metrics. The controller/processor 475 is also in charge of HARQ operation, retransmission of lost packets, and signalings to the UE 450. The transmitting processor 416 performs various signal processing functions used for Layer 1 (that is, PHY). The signal processing functions include encoding and interleaving so as to ensure FEC (Forward Error Correction) at the UE 450 and mappings to signal clusters corresponding to different modulation schemes (i.e., BPSK, QPSK, M-PSK, M-QAM, etc.). Then, the encoded and modulated symbols are split into parallel streams, then each stream is mapped to multicarrier subcarriers to be multiplexed with a reference signal (i.e., pilot) in time domain and/or frequency domain, and then they are combined together using Inverse Fast Fourier Transform (IFFT) to generate a physical channel carrying time-domain multicarrier symbol streams. The multicarrier streams are processed with spatial pre-decoding to generate multiple spatial streams. Each spatial stream is subsequently provided by the transmitter 418 to different antennas 420. Each transmitter 418 modulates a corresponding spatial stream to be transmitted onto a Radio Frequency (RF) subcarrier. At the UE 450, each receiver 454 receives a signal via the corresponding antenna 452. Each receiver 454 recovers the information modulated onto the RF carrier and provides the information to the receiving processor 456. The receiving processor 456 performs various signal processing functions of Layer 1. The receiving processor 456 processes the information with spatial process to recover any spatial stream targeting the UE 450. If there are multiple spatial stream are targeting the UE 450, they can be combined into one single multicarrier symbol stream through the receiving processor 456. The receiving processor 456 then converts the multicarrier symbol stream from time domain to frequency domain using FFT. A frequency-domain signal includes a single multicarrier symbol stream of each subcarrier used for multicarrier signals. The symbols on each subcarrier and the reference signal are recovered and demodulated by determining a most possible signal cluster point transmitted by the eNB 410. The soft decision is decoded and de-interleaved to recover the data and control signal originally transmitted by the eNB 410 on a physical channel. Then the data and control signal are provided to the controller/processor 459. The controller/processor 459 performs functions of Layer 2. The controller/processor 459 may be connected to the memory 460 that stores program codes and data. The memory 460 may be called a computer readable media. In UL, the controller/processor 459 provides multiplexing between the transport channel and the logical channel, packet reassembling, decryption, header decompression, and control signal processing so as to recover the higher-layer packet coming from the core network. The controller/processor 459 can also perform error detection using ACK and/or NACK protocols to support the HARQ operation. In UL, the data source 467 provides a higher-layer packet to the controller/processor 459. The data source 467 illustrates all protocol layers above the L2 layer. Similar as the transmitting function of the eNB 410 described in DL transmission, the controller/processor 459 provides header compression, encryption, packet segmentation and reordering, and multiplexing between a logical channel and a transport channel based on the radio resource allocation of the base station 410 so as to provide the functions of Layer 2 used for the control plane and user plane. The controller/processor 459 is also in charge of HARQ operation, retransmission of lost packets, and signalings to the eNB 410. Channel estimation exported by a channel estimator 458 from a reference signal or a feedback transmitted by the NB 410 may be used by the transmitting processor 468 to select appropriate decoding and modulation schemes, and to facilitate spatial processing. A spatial stream generated by the transmitting processor 468 is provided to different antennas 452 via a single transmitter 454. Each transmitter 454 modulates a corresponding spatial stream to be transmitted onto an RF subcarrier. The function of the gNB 410 is similar as the receiving function of the UE 450 described in the DL transmission. Each receiver 418 receives a signal via the corresponding antenna 420. Each receiver 418 recovers the information modulated onto the RF carrier, and provides the information to the receiving processor 470. The receiving processor 470 provides functions of Layer 1. The controller/processor 475 provides functions of Layer 2. The controller/processor 475 may be connected to the memory 476 that stores program codes and data. The memory 476 may be called a computer readable media. In UL, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network. The controller/processor 475 can also perform error detection using ACK and/or NACK protocols to support the HARQ operation.

In one subembodiment, the UE 450 includes at least one processor and at least one memory. The at least one memory includes computer program codes. The at least one memory and the computer program codes are configured to be used in collaboration with the at least one processor.

In one subembodiment, the UE 450 includes a memory that stores a computer readable instruction program. The computer readable instruction program generates an action when executed by at least one processor. The action includes: monitoring a first signaling set in a first time-frequency resource set; transmitting a first radio signal; and monitoring a second signaling set and a third signaling set in a second time-frequency resource set and a third time-frequency resource set respectively.

In one subembodiment, the eNB 410 includes at least one processor and at least one memory. The at least one memory includes computer program codes. The at least one memory and the computer program codes are configured to be used in collaboration with the at least one processor.

In one subembodiment, the eNB 410 includes a memory that stores a computer readable instruction program. The computer readable instruction program generates an action when executed by at least one processor. The action includes: transmitting a first signaling set in a first time-frequency resource set; receiving a first radio signal; and transmitting a second signaling set and a third signaling set in a second time-frequency resource set and a third time-frequency resource set respectively.

In one subembodiment, the UE 450 corresponds to the UE in the disclosure.

In one subembodiment, the eNB 410 corresponds to the base station in the disclosure.

In one subembodiment, at least one of the receiving processor 456 and the controller/processor 459 monitors a first signaling set in a first time-frequency resource set.

In one subembodiment, at least one of the receiving processor 456 and the controller/processor 459 monitors a second signaling set and a third signaling set in a second time-frequency resource set and a third time-frequency resource set respectively.

In one subembodiment, at least one of the receiving processor 456 and the controller/processor 459 monitors K channel quality (qualities) of K target antenna port group(s) respectively.

In one subembodiment, at least one of the receiving processor 456 and the controller/processor 459 receives a second radio signal.

In one subembodiment, at least one of the transmitting processor 468 and the controller/processor 459 transmits a first radio signal.

In one subembodiment, at least one of the transmitting processor 416 and the controller/processor 475 transmits a first signaling set in a first time-frequency resource set.

In one subembodiment, at least one of the transmitting processor 416 and the controller/processor 475 transmits a second signaling set and a third signaling set in a second time-frequency resource set and a third time-frequency resource set respectively.

In one subembodiment, at least one of the transmitting processor 416 and the controller/processor 475 transmits the first signaling set in at least one of K target antenna port group(s).

In one subembodiment, at least one of the transmitting processor 416 and the controller/processor 475 transmits a second radio signal.

In one subembodiment, at least one of the receiving processor 470 and the controller/processor 475 receives a first radio signal.

Embodiment 5

Figure 5:
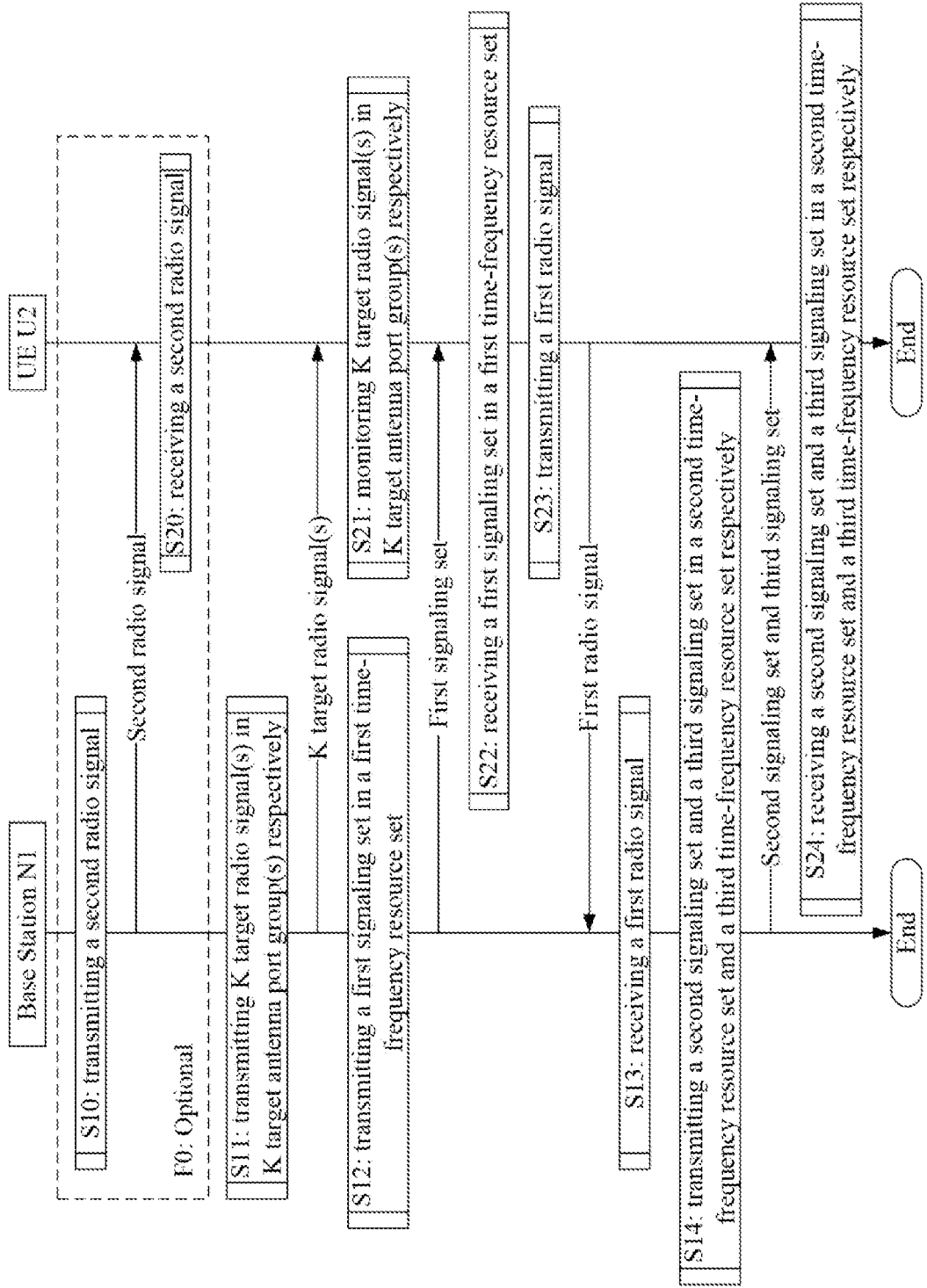
FIG. 5 is a flowchart of transmission of a first signaling set according to one embodiment of the disclosure.

Embodiment 5 illustrates a example of a flowchart of transmission of a first signaling set according to the disclosure, as shown in FIG. 5. In FIG. 5, a base station N1 is a maintenance base station for a serving cell of a UE U2, and steps in box F0 are optional.

The base station N1 transmits a second radio signal in S10, transmits K target radio signal(s) in K target antenna port group(s) respectively in S11, transmits a first signaling set in a first time-frequency resource set in S12, receives a first radio signal in S13, and transmits a second signaling set and a third signaling set in a second time-frequency resource set and a third time-frequency resource set respectively in S14.

The UE U2 receives a second radio signal in S20, monitors K target radio signal(s) in K target antenna port group(s) respectively in S21, receives a first signaling set in a first time-frequency resource set in S22, transmits a first radio signal in S23, and receives a second signaling set and a third signaling set in a second time-frequency resource set and a third time-frequency resource set respectively in S24.

In Embodiment 5, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a monitoring of the second signaling set; the first radio signal is used for determining that a number of maximum blind decoding times for the third signaling set in the third time-frequency resource set changes from X1 to X3, the X1 and the X3 being positive integers respectively, and the X1 being greater than the X3; a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; the X2 is a positive integer less than the X1; a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain; the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs; a number of REs included in any one of the X1 first-type RE sets other than the X3 first-type RE set(s) is less than or equal to a number of REs included in any one of the X3 second-type RE set(s); the first radio signal is used for determining a first antenna port group, the first antenna port group includes a positive integer number of antenna ports, the UE U2 assumes that the second signaling set is transmitted by the first antenna port group; the K target radio signal(s) is(are) used for determining K channel quality (qualities), at least one of the K target antenna port group(s) is used for transmitting the first signaling set, the first antenna port group is one antenna port group other than the K target antenna port group(s), and the K is a positive integer; the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set.

In one subembodiment, the RE in the disclosure occupies one Orthogonal Frequency Division Multiplexing (OFDM) symbol in time domain and occupies one subcarrier in frequency domain.

In one affiliated embodiment of the above subembodiment, a subcarrier spacing corresponding to the subcarrier is one of 15 kHz, 60 kHz, 120 kHz or 240 kHz.

In one subembodiment, the X1 is less than or equal to X, a summation of the X2 and the X3 is less than or equal to the X, and the X is a positive integer.

In one affiliated embodiment of the above subembodiment, the X is greater than 43.

In one affiliated embodiment of the above subembodiment, the X is a number of maximum blind decoding times supported by the UE U2 on a given subcarrier, and at least one of the first signaling set, the second signaling set or the third signaling set is transmitted on the given carrier.

In one affiliated embodiment of the above subembodiment, the X is a fixed constant.

In one affiliated embodiment of the above subembodiment, the X is a number of maximum blind decoding times supported by the UE U2, and the X is related to a number of carriers currently configured for the UE U2.

In one subembodiment, the X1 is equal to a summation of the X2 and the X3.

In one subembodiment, the phrase that a number of REs included in the first signaling set is the same as a number of REs included in the third signaling set refers that: the first signaling set includes N1 first signaling(s), the third signaling set includes N3 third signaling(s), a number of REs occupied by the N1 first signaling(s) is the same as a number of REs occupied by the N3 third signaling(s), the N1 and the N3 are positive integers respectively.

In one subembodiment, the second time-frequency resource block is obtained by the first time-frequency resource block slipping through a positive integer number of OFDM symbols in time domain.

In one subembodiment, a subcarrier set occupied by the first time-frequency resource block in frequency domain is the same as a subcarrier set occupied by the second time-frequency resource block in frequency domain.

In one subembodiment, the first time-frequency resource block occupies a first OFDM symbol set in time domain, the second time-frequency resource block occupies a second OFDM symbol set in time domain, and a number of OFDM symbols occupied by the first OFDM symbol set is the same as a number of OFDM symbols occupied by the second OFDM symbol set.

In one affiliated embodiment of the above subembodiment, the first OFDM symbol set occupies consecutive OFDM symbols.

In one affiliated embodiment of the above subembodiment, the second OFDM symbol set occupies consecutive OFDM symbols.

In one affiliated embodiment of the above subembodiment, a first OFDM symbol occupied by the first OFDM symbol set in time domain differs by a positive integer number of OFDM symbols from a first OFDM symbol occupied by the second OFDM symbol set in time domain.

In one subembodiment, the first-type RE set is a candidate for the first signaling set.

In one subembodiment, the first-type RE set is a candidate for the M1 format(s) of physical layer signaling(s).

In one subembodiment, the second-type RE set is a candidate for the third signaling set.

In one subembodiment, the second-type RE set is a candidate for the M3 format(s) of physical layer signaling(s).

In one subembodiment, the patter refers to: a time-domain position and a frequency-domain positions of REs occupied by a given RE set in a given time-frequency resource block; the given RE set is the first-type RE set, and the given time-frequency resource block is the first time-frequency resource block; or the given RE set is the second-type RE set, and the given time-frequency resource block is the second time-frequency resource block.

In one subembodiment, an Aggregation Level (AL) corresponding to any one of the X1 first-type RE sets other than the X3 first-type RE set(s) is less than or equal to an AL corresponding to any one of the X3 second-type RE set(s).

In one subembodiment, the first antenna port group includes a positive integer umber of antenna ports.

In one affiliated embodiment of the above subembodiment, the antenna port is formed by multiple physical antennas through antenna virtualization superstition. Mapping coefficients from the antenna port to the multiple physical antennas form a beamforming vector, which is used for the antenna virtualization to form a beam.

In one subembodiment, the first antenna port group corresponds to P transmitting beam(s).

In one affiliated embodiment of the above subembodiment, the P is equal to 1.

In one affiliated embodiment of the above subembodiment, the first antenna port group corresponds to a candidate transmitting beam recommended to the base station N1 by the UE U2.

In one subembodiment, the first antenna port group corresponds to a first receiving antenna port group.

The UE U2 detects a UE-specific physical layer control signaling in a receiving antenna port group other than the first receiving antenna port group, before transmitting the first radio signal.

In one subembodiment, the UE U2 monitors a physical layer control signaling in receiving antenna port group(s) corresponding to the K candidate antenna port group(s).

In one affiliated embodiment of the above subembodiment, the physical layer control signaling is at least one of a PDCCH, an NR-PDCCH or an SPDCCH.

In one subembodiment, a given target radio signal includes at least one of a target control channel, a target data channel or a target reference signal, and the UE U2 determines a given channel quality according to at least one of the target control channel, the target data channel or the target reference signal; the given target radio signal is any one of the K target radio signal(s), and the given channel quality is the channel quality determined according to the target radio signal.

In one affiliated embodiment of the above subembodiment, the target control channel is a physical layer control channel.

In one affiliated embodiment of the above subembodiment, the target data channel is a physical layer data channel.

In one affiliated embodiment of the above subembodiment, the target reference signal is at least one of a Synchronization Sequence (SS), a Demodulation Reference Signal (DMRS), or a Channel State Information Reference Signal (CSI-RS).

In one subembodiment, the channel quality is at least one of a Reference Signal Received Power (RSRP), a Reference Signal Received Quality (RSRQ), a Received Signal Strength Indicator (RSSI) or a Signal to Noise Rate (SNR).

In one subembodiment, the channel quality is a Block Error Rate (BLER) of a physical layer control signaling in the candidate antenna port group corresponding to the channel quality.

In one subembodiment, the channel quality is an average result of monitoring in a fixed time window.

In one subembodiment, in a time window of a fixed length, the K channel quality (qualities) is (are all) less than a give threshold, and the UE U2 transmits the first radio signal.

In one affiliated embodiment of the above subembodiment, the given threshold is one BLER.

In one affiliated embodiment of the above subembodiment, the given threshold is in unit of dB.

In one affiliated embodiment of the above subembodiment, the given threshold is in unit of dBm.

In one subembodiment, the fourth time-frequency resource set corresponds to time-frequency resources occupied by one or more Control Resource Set (CORESETs).

In one subembodiment, the second time-frequency resource set is a part of the fourth time-frequency resource set in one slot, and the one slot includes a positive integer number of OFDM symbols.

In one subembodiment, the fifth time-frequency resource set corresponds to time-frequency resources occupied by one or more CORESETs.

In one subembodiment, the first time-frequency resource set and the third time-frequency resource set each are a part of the fifth time-frequency resource set in one slot, and the one slot includes a positive integer number of OFDM symbols.

In one subembodiment, the phrase that the first radio signal is used for determining that a number of maximum blind decoding times for the third signaling set in the third time-frequency resource set changes from X1 to X3 refers that: the UE U2 performs blind decoding of the second signaling set in a given time window, the third time-frequency resource set is a part of the fifth time-frequency resource set in any one slot belonging to the given time window, and a position of the give time window is related to time-domain resources occupied by the first radio signal.

In one subembodiment, the second radio signal is one RRC signaling.

In one affiliated embodiment of the above subembodiment, the second radio signal is UE specific.

Embodiment 6

Figure 6:
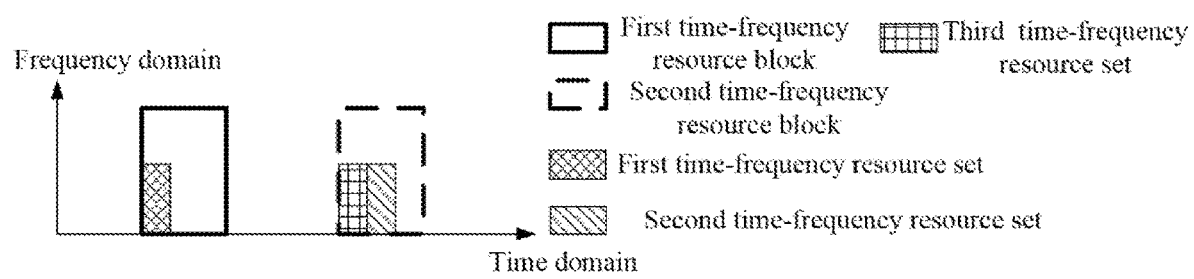
FIG. 6 is a diagram illustrating a first time-frequency resource set, a second time-frequency resource set and a third time-frequency resource set according to one embodiment of the disclosure.

Embodiment 6 illustrates an example of a diagram of a first time-frequency resource set, a second time-frequency resource set and a third time-frequency resource set according to the disclosure, as shown in FIG. 6. In FIG. 6, the first time-frequency resource set belongs to a first time-frequency resource block, the second time-frequency resource set and the third time-frequency resource set belongs to a second time-frequency resource block.

In one subembodiment, a given time-frequency resource set occupies frequency-domain resources corresponding to a positive integer number of Physical Resource Blocks (PRBs) in frequency domain, and occupies a positive integer number of OFDM symbols in time domain; and the given time-frequency resource set is one of the first time-frequency resource set, the second time-frequency resource set or the third time-frequency resource set.

In one subembodiment, a given time-frequency resource set corresponds to one search space, and the given time-frequency resource set is one of the first time-frequency resource set, the second time-frequency resource set or the third time-frequency resource set.

In one subembodiment, a given time-frequency resource block corresponds to one CORSET, and the given time-frequency resource block is one of the first time-frequency resource block or the second time-frequency resource block.

In one subembodiment, the first time-frequency resource block and the second time-frequency resource block belong to different subframes respectively.

In one subembodiment, the first time-frequency resource block and the second time-frequency resource block belong to different slots respectively.

Embodiment 7

Figure 7:
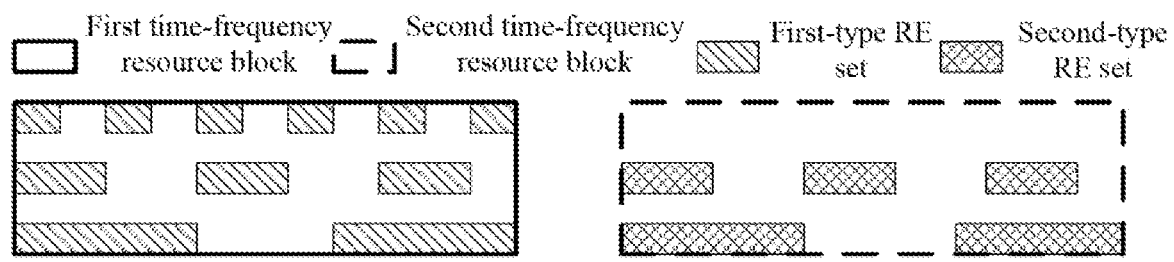
FIG. 7 is a diagram illustrating a first-type RE set and a second-type RE set according to one embodiment of the disclosure.

Embodiment 7 illustrates a diagram of a first-type RE set and a second-type RE set according to the disclosure, as shown in FIG. 7. In FIG. 7, small rectangles filled with slashes correspond to a pattern of X1 first-type RE sets in a first time-frequency resource block, small rectangles filled with cross lines correspond to a pattern of X3 second-type RE sets in a second time-frequency resource block; a pattern of the X3 second-type RE sets in the second time-frequency resource block is the same as a pattern of X3 first-type RE sets among the X1 first-type RE sets in the first time-frequency resource block.

In one subembodiment, the first-type RE set corresponds to one candidate.

In one subembodiment, the second-type RE set corresponds to one candidate.

In one subembodiment, numbers of REs occupied by the X3 second-type RE sets are all greater than a first threshold, the X1 first-type RE sets further include X4 first-type RE sets, and numbers of REs occupied by the X4 first-type RE sets are all not greater than the first threshold; the first threshold is a positive integer.

In one affiliated embodiment of the above subembodiment, the first threshold is one of 144, 288 or 576.

Embodiment 8

Figure 8:
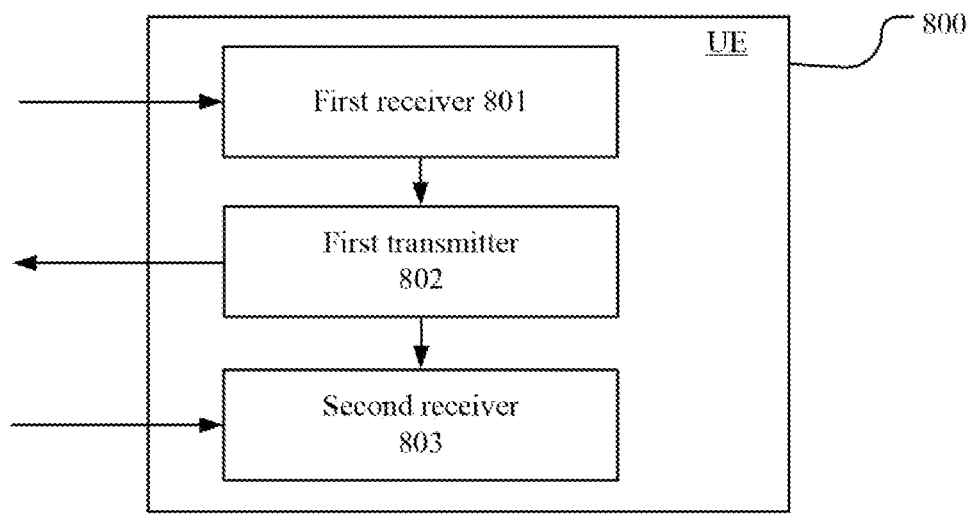
FIG. 8 is a structure block diagram illustrating a processing device in a UE according to one embodiment of the disclosure.

Embodiment 8 illustrates an example of a structure block diagram of a processing device in a UE, as shown in FIG. 8. In FIG. 8, the processing device 800 in the UE mainly includes a first receiver 801, a first transmitter 802 and a second receiver 803.

The first receiver 801 monitors a first signaling set in a first time-frequency resource set.

The first transmitter 802 transmits a first radio signal.

The second receiver 803 monitors a second signaling set and a third signaling set in a second time-frequency resource set and a third time-frequency resource set respectively.

In Embodiment 8, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a monitoring of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

In one subembodiment, a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; and the X2 is a positive integer less than the X1.

In one subembodiment, a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

In one subembodiment, the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs.

In one subembodiment, a number of REs included in any one of the X1 first-type RE sets other than the X3 first-type RE set(s) is less than or equal to a number of REs included in any one of the X3 second-type RE set(s).

In one subembodiment, the first radio signal is used for determining a first antenna port group, the first antenna port group includes a positive integer number of antenna ports, the UE U2 assumes that the second signaling set is transmitted by the first antenna port group.

In one subembodiment, the first receiver 801 further monitors K target radio signal(s) in K target antenna port group(s) respectively; the K target radio signal(s) is(are) used for determining K channel quality (qualities), at least one of the K target antenna port group(s) is used for transmitting the first signaling set, the first antenna port group is one antenna port group other than the K target antenna port group(s), and the K is a positive integer.

In one subembodiment, the first receiver 801 further receives a second radio signal, wherein the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set.

In one subembodiment, the first receiver 801 includes at least one of the receiving processor 456 and the controller/processor 459 illustrated in Embodiment 4.

In one subembodiment, the first transmitter 802 includes at least one of the transmitting processor 468 and the controller/processor 459 illustrated in Embodiment 4.

In one subembodiment, the second receiver 803 includes at least one of the receiving processor 456 and the controller/processor 459 illustrated in Embodiment 4.

Embodiment 9

Figure 9:
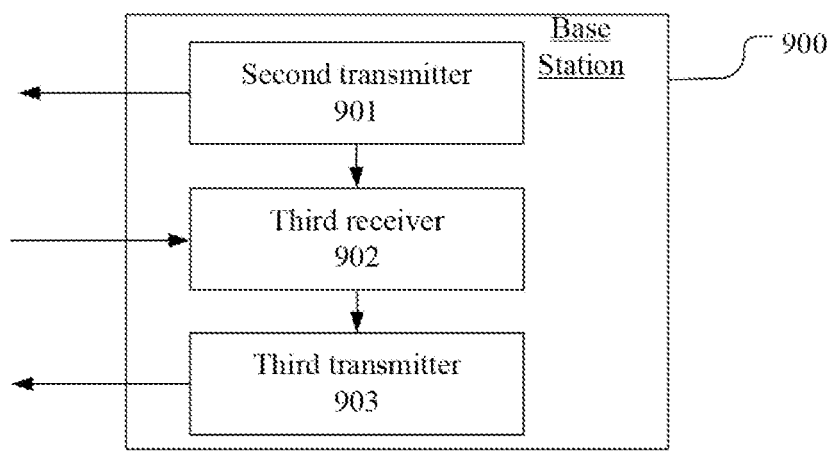
FIG. 9 is a structure block diagram illustrating a processing device in a base station according to one embodiment of the disclosure.

Embodiment 9 illustrates an example of a structure block diagram of a processing device in a base station, as shown in FIG. 9. In FIG. 9, the processing device 900 in the base station mainly includes a second transmitter 901, a third receiver 902 and a third transmitter 903.

The second transmitter 901 transmits a first signaling set in a first time-frequency resource set.

The third receiver 902 receives a first radio signal.

The third transmitter 903 transmits a second signaling set and a third signaling set in a second time-frequency resource set and a third time-frequency resource set respectively.

In Embodiment 9, the first signaling set, the second signaling set and third signaling set include M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a transmission of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3.

In one subembodiment, a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs included in the first signaling set is the same as a number of REs included in the third signaling set; and the X2 is a positive integer less than the X1.

In one subembodiment, a pattern of REs included in the first time-frequency resource set in a first time-frequency resource block is the same as a pattern of REs included in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

In one subembodiment, the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs.

In one subembodiment, a number of REs included in any one of the X1 first-type RE sets other than the X3 first-type RE set(s) is less than or equal to a number of REs included in any one of the X3 second-type RE set(s).

In one subembodiment, the first radio signal is used for determining a first antenna port group, the first antenna port group includes a positive integer number of antenna ports, the second signaling set is transmitted by the first antenna port group.

In one subembodiment, the second transmitter 901 further transmits K target radio signal(s) in K target antenna port group(s) respectively; the K target radio signal(s) is(are) used by a transmitter of the first radio signal to determine K channel quality (qualities) respectively, at least one of the K target antenna port group(s) is used for transmitting the first signaling set, the first antenna port group is one antenna port group other than the K target antenna port group(s), and the K is a positive integer.

In one subembodiment, the second transmitter 901 further transmits a second radio signal; the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set.

In one subembodiment, the second transmitter 901 includes at least one of the transmitting processor 416 and the controller/processor 475 illustrated in Embodiment 4.

In one subembodiment, the third receiver 902 includes at least one of the receiving processor 470 and the controller/processor 475 illustrated in Embodiment 4.

In one subembodiment, the third transmitter 903 includes at least one of the transmitting processor 416 and the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the present disclosure includes but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, etc. The base station in the present application includes but not limited to macro-cellular base stations, micro-cellular base stations, home base stations, relay base station and radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for multi-antenna communication, comprising:

receiving a second radio signal;

monitoring a first signaling set in a first time-frequency resource set;

transmitting a first radio signal; and monitoring a second signaling set and a third signaling set in a second time-frequency resource set and a third time-frequency resource set respectively;

wherein the first signaling set, the second signaling set and third signaling set comprise M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a monitoring of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3; the first radio signal is transmitted in a Random Access Channel (RACH); the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set; the fourth time-frequency resource set corresponds to time-frequency resources occupied by one Control Resource Set (CORESET), the fifth time-frequency resource set corresponds to time-frequency resources occupied by one CORESET; the second time-frequency resource set corresponds to one search space; the first time-frequency resource set and the third time-frequency resource set belongs to different slots, the second time-frequency resource set and the third time-frequency resource set belongs to one slot.

2. The method according to claim 1, wherein a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs occupied by candidates of the first signaling set is the same as a number of REs occupied by candidates of the third signaling set; and the X2 is a positive integer less than the X1;

or, wherein a pattern of REs comprised in the first time-frequency resource set in a first time-frequency resource block is the same as a pattern of REs comprised in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

3. The method according to claim 2, wherein the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs;

or, wherein a number of REs comprised in any one of the X1 first-type RE sets other than the X3 first-type RE set(s) is less than or equal to a number of REs comprised in any one of the X3 second-type RE set(s).

4. The method according to claim 1, comprising:
monitoring K target radio signal(s) in K target antenna port group(s) respectively;
wherein the first radio signal is used for determining a first antenna port group, the first antenna port group comprises a positive integer number of antenna ports, the UE assumes that the second signaling set is transmitted by the first antenna port group; the K target radio signal(s) is(are) used for determining K channel quality (qualities), at least one of the K target antenna port group(s) is used for transmitting the first signaling set, the first antenna port group is one antenna port group other than the K target antenna port group(s), and the K is a positive integer;
or, the first radio signal is used for Beam Recovery Request or Beam Link Failure.

5. The method according to claim 1, wherein the third time-frequency resource set corresponds to one search space.

6. A method in a base station for multi-antenna communication, comprising:
transmitting a second radio signal;
transmitting a first signaling set in a first time-frequency resource set;
receiving a first radio signal; and
transmitting a second signaling set and a third signaling set in a second time-frequency resource set and a third time-frequency resource set respectively;
wherein the first signaling set, the second signaling set and third signaling set comprise M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a transmission of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3; the first radio signal is transmitted in a Random Access Channel (RACH), or the first radio signal is transmitted in an UL-SCH (Uplink Shared Channel), or the first radio signal is transmitted in Uplink Control Information (UCI); the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set; the fourth time-frequency resource set corresponds to time-frequency resources occupied by one Control Resource Set (CORESET), the fifth time-frequency resource set corresponds to time-frequency resources occupied by one CORESET; the second time-frequency resource set corresponds to one search space; the first time-frequency resource set and the third time-frequency resource set belongs to different slots, the second time-frequency resource set and the third time-frequency resource set belongs to one slot.

7. The method according to claim 6, wherein a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs occupied by candidates of the first signaling set is the same as a number of REs occupied by candidates of the third signaling set; and the X2 is a positive integer less than the X1;

or, wherein a pattern of REs comprised in the first time-frequency resource set in a first time-frequency resource block is the same as a pattern of REs comprised in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

8. The method according to claim 7, wherein the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs;

or, wherein a number of REs comprised in any one of the X1 first-type RE sets other than the X3 first-type RE set(s) is less than or equal to a number of REs comprised in any one of the X3 second-type RE set(s).

9. The method according to claim 6, comprising:
transmitting K target radio signal(s) in K target antenna port group(s) respectively;
wherein the first radio signal is used for determining a first antenna port group, the first antenna port group comprises a positive integer number of antenna ports, and the second signaling set is transmitted by the first antenna port group; the K target radio signal(s) is(are) used by a transmitter of the first radio signal to determine K channel quality (qualities) respectively, at least one of the K target antenna port group(s) is used for transmitting the first signaling set, the first antenna port group is one antenna port group other than the K target antenna port group(s), and the K is a positive integer;
or, the first radio signal is used for Beam Recovery Request or Beam Link Failure.

10. The method according to claim 6, wherein the third time-frequency resource set corresponds to one search space.

11. A UE for multi-antenna communication, comprising:
a first receiver, to receive a second radio signal, and monitor a first signaling set in a first time-frequency resource set;
a first transmitter, to transmit a first radio signal; and
a second receiver, to monitor a second signaling set and a third signaling set in a second time-frequency resource set and a third time-frequency resource set respectively;
wherein the first signaling set, the second signaling set and third signaling set comprise M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a monitoring of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3; the first radio signal is transmitted in a Random Access Channel (RACH), or the first radio signal is transmitted in an UL-SCH (Uplink Shared Channel), or the first radio signal is transmitted in Uplink Control Information (UCI); the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set; the fourth time-frequency resource set corresponds to time-frequency resources occupied by one Control Resource Set (CORESET), the fifth time-frequency resource set corresponds to time-frequency resources occupied by one CORESET; the second time-frequency resource set corresponds to one search space; the first time-frequency resource set and the third time-frequency resource set belongs to different slots, the second time-frequency resource set and the third time-frequency resource set belongs to one slot.

12. The UE according to claim 11, wherein a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs occupied by candidates of the first signaling set is the same as a number of REs occupied by candidates of the third signaling set; and the X2 is a positive integer less than the X1;

or, wherein a pattern of REs comprised in the first time-frequency resource set in a first time-frequency resource block is the same as a pattern of REs comprised in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

13. The UE according to claim 12, wherein the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs;

or, wherein a number of REs comprised in any one of the X1 first-type RE sets other than the X3 first-type RE set(s) is less than or equal to a number of REs comprised in any one of the X3 second-type RE set(s).

14. The UE according to claim 11, wherein the first receiver monitors K target radio signal(s) in K target antenna port group(s) respectively; wherein the first radio signal is used for determining a first antenna port group, the first antenna port group comprises a positive integer number of antenna ports, the UE assumes that the second signaling set is transmitted by the first antenna port group; the K target radio signal(s) is(are) used for determining K channel quality (qualities), at least one of the K target antenna port group(s) is used for transmitting the first signaling set, the first antenna port group is one antenna port group other than the K target antenna port group(s), and the K is a positive integer;

or, the first radio signal is used for Beam Recovery Request or Beam Link Failure.

15. The UE according to claim 11, wherein the third time-frequency resource set corresponds to one search space.

16. A base station for multi-antenna communication, comprising:
a second transmitter, to transmit a second radio signal, and transmit a first signaling set in a first time-frequency resource set;

a third receiver, to receive a first radio signal;

a third transmitter, to transmit a second signaling set and a third signaling set in a second time-frequency resource set and a third time-frequency resource set respectively;

wherein the first signaling set, the second signaling set and third signaling set comprise M1 format(s) of physical layer signaling(s), M2 format(s) of physical layer signaling(s) and M3 format(s) of physical layer signaling(s) respectively, the M1, the M2 and the M3 being positive integers respectively; the first radio signal is used for triggering a transmission of the second signaling set; and the first radio signal is used for determining that a number of maximum blind decoding times for the third signaling set in the third time-frequency resource set changes from X1 to X3, the X1 and the X3 being positive integers respectively, and the X1 being greater than the X3; the first radio signal is transmitted in a Random Access Channel (RACH), or the first radio signal is transmitted in an UL-SCH (Uplink Shared Channel), or the first radio signal is transmitted in Uplink Control Information (UCI); the second radio signal is used for determining a fourth time-frequency resource set and a fifth time-frequency resource set, the second time-frequency resource set belongs to the fourth time-frequency resource set, the first time-frequency resource set and the third time-frequency resource set both belong to the fifth time-frequency resource set; the fourth time-frequency resource set corresponds to time-frequency resources occupied by one Control Resource Set (CORESET), the fifth time-frequency resource set corresponds to time-frequency resources occupied by one CORESET; the second time-frequency resource set corresponds to one search space; the first time-frequency resource set and the third time-frequency resource set belongs to different slots, the second time-frequency resource set and the third time-frequency resource set belongs to one slot.

17. The base station according to claim 16, wherein a maximum of X1 times of blind decoding are performed for the first signaling set in the first time-frequency resource set, a maximum of X2 time(s) of blind decoding is(are) performed for the second signaling set in the second time-frequency resource set, and a maximum of X3 time(s) of blind decoding is(are) performed for the third signaling set in the third time-frequency resource set; a number of REs occupied by candidates of the first signaling set is the same as a number of REs occupied by candidates of the third signaling set; and the X2 is a positive integer less than the X1;

or, wherein a pattern of REs comprised in the first time-frequency resource set in a first time-frequency resource block is the same as a pattern of REs comprised in the third time-frequency resource set in a second time-frequency resource block, the first time-frequency resource set and the third time-frequency resource set belong to the first time-frequency resource block and the second time-frequency resource block respectively, the first time-frequency resource block and the second time-frequency resource block occupy same frequency-domain resources, the first time-frequency resource block and the second time-frequency resource block occupy a same length of time in time domain.

18. The base station according to claim 17, wherein the X1 times of blind decoding correspond to X1 first-type RE sets respectively, the X3 time(s) of blind decoding corresponds (correspond) to X3 second-type RE set(s) respectively, a pattern of the X3 second-type RE set(s) in the second time-frequency resource block is the same as a pattern of X3 first-type RE set(s) among the X1 first-type RE sets in the first time-frequency resource block, each of the X1 first-type RE sets is composed of a positive integer number of REs, and each of the X3 second-type RE set(s) is composed of a positive integer number of REs;

or, wherein a number of REs comprised in any one of the X1 first-type RE sets other than the X3 first-type RE set(s) is less than or equal to a number of REs comprised in any one of the X3 second-type RE set(s).

19. The base station according to claim 16, wherein the second transmitter transmits K target radio signal(s) in K target antenna port group(s) respectively; wherein the first radio signal is used for determining a first antenna port group, the first antenna port group comprises a positive integer number of antenna ports, and the second signaling set is transmitted by the first antenna port group; the K target radio signal(s) is(are) used by a transmitter of the first radio signal to determine K channel quality (qualities) respectively, at least one of the K target antenna port group(s) is used for transmitting the first signaling set, the first antenna port group is one antenna port group other than the K target antenna port group(s), and the K is a positive integer;

or, the first radio signal is used for Beam Recovery Request or Beam Link Failure.

20. The base station according to claim 16, wherein the third time-frequency resource set corresponds to one search space.

* * * * *